April 23, 1968     W. W. ARE, JR     3,378,910
LINEAR FORCE-APPLYING TOOL FOR THE SEPARATION OF JOINED PARTS
Filed Oct. 18, 1965     2 Sheets-Sheet 1
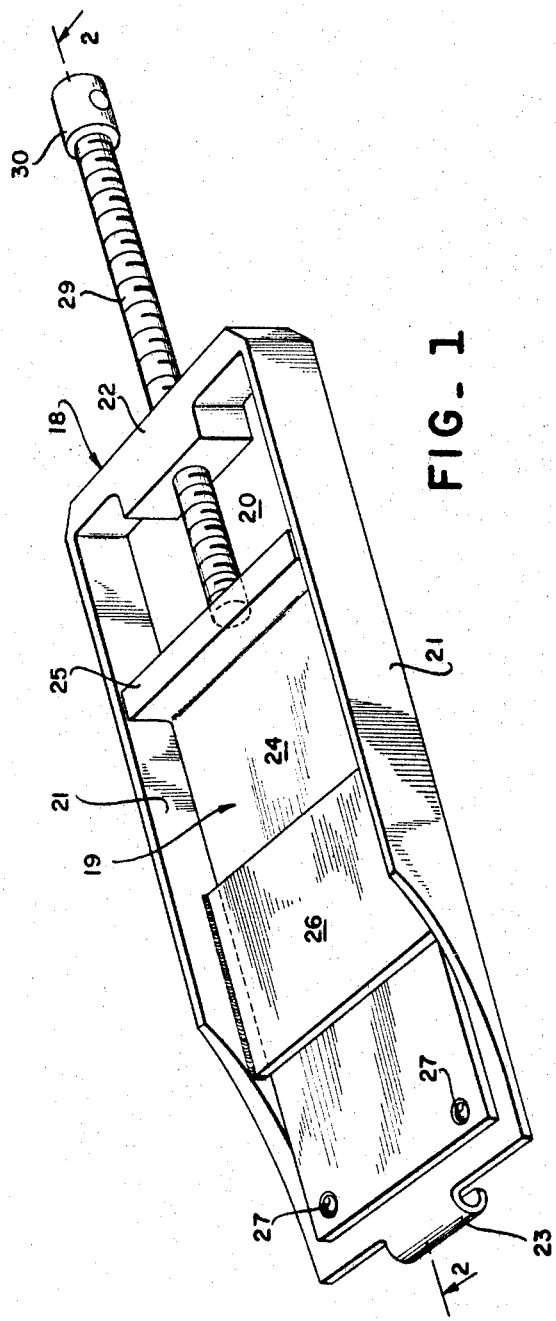
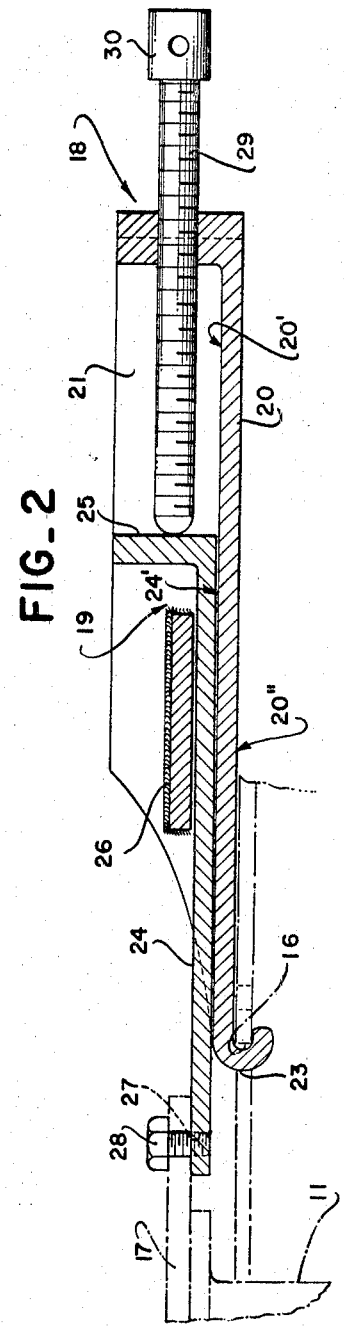
INVENTOR.
WARD W. ARE, JR.
BY George C. Sullivan
Agent April 23, 1968     W. W. ARE, JR     3,378,910
LINEAR FORCE-APPLYING TOOL FOR THE SEPARATION OF JOINED PARTS
Filed Oct. 18, 1965     2 Sheets-Sheet 2
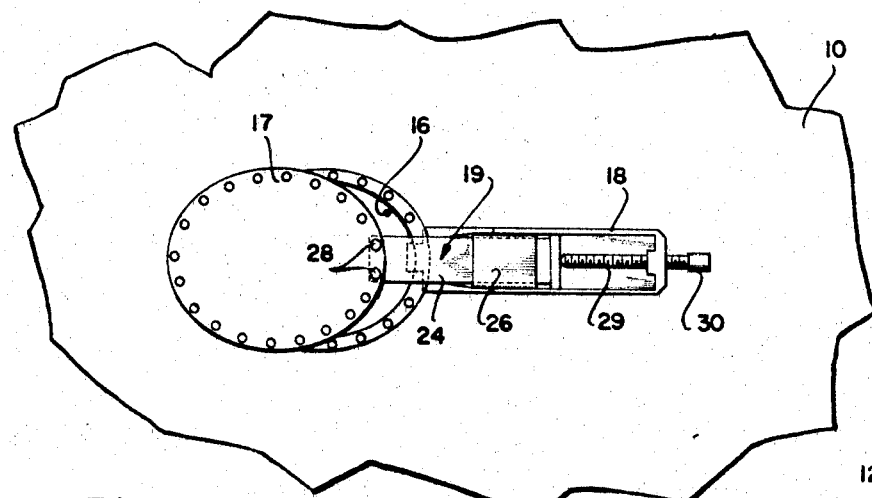
FIG_3
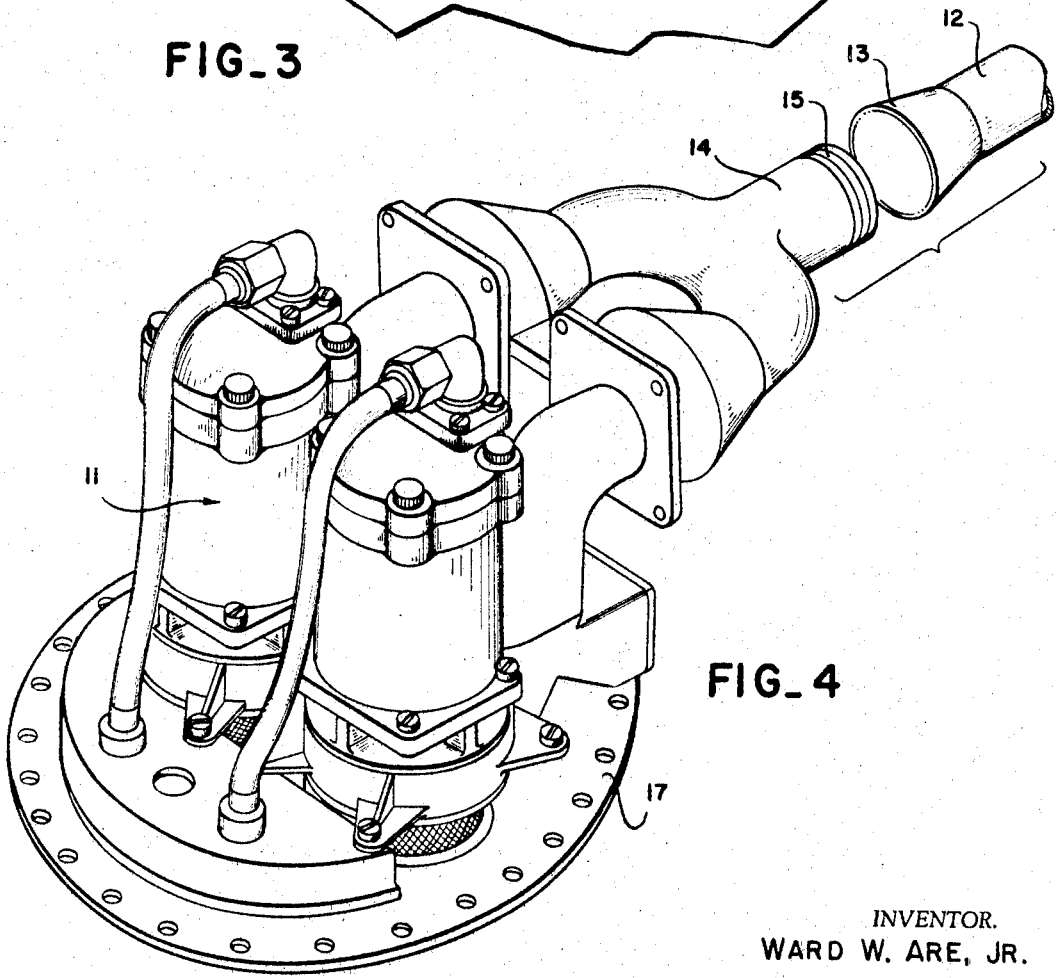
FIG_4
INVENTOR.
WARD W. ARE, JR.
BY
*George C. Sullivan*
Agent

United States Patent Office 3,378,910
Patented Apr. 23, 1968

3,378,910
LINEAR FORCE-APPLYING TOOL FOR THE
SEPARATION OF JOINED PARTS
Ward W. Are, Jr., Marietta, Ga., assignor to Lockheed
Aircraft Corporation, Burbank, Calif.
Filed Oct. 18, 1965, Ser. No. 497,323
2 Claims. (Cl. 29—237)

ABSTRACT OF THE DISCLOSURE

A tool is provided to facilitate removal of a pump assembly mounted on the internal surface of an access door in the wing tank of an aircraft. The conduit from the pump is force-fitted within an adjacent conduit, and the joint is sealed by a conventional O-ring. The tool allows for the application of a uniform force of sufficient magnitude on and against the pump and its conduit to cause a separation of the conduit joint especially when frozen as a result of a swelling of the O-ring as normally occurs without rupturing or otherwise damaging the pump, skin, etc., of the aircraft component.

---

This invention relates to tools of the force-applying type for the separation of engaged parts and more particularly to an improved tool by which a relatively slow uniform force is applied linearly to joined parts causing the clean separation thereof.

While the present invention has general application wherever a linear force is required to separate joined parts, it finds particular utility in separating overlapped or telescoped tubes having curved configurations whereby an inherent resiliency or spring exists in the assembly. In installations where it is impossible to simultaneously engage both tubes, the force necessary to effect separation when applied to the accessible tube is critical. This is exaggerated in those situations where the tubes are associated with and/or carry relatively delicate parts or structures which may be easily impaired.

Consider, for example, the internal pipes and ducting such as fuel lines employed in aircraft. These pipe lines extend throughout cavities internally of each aircraft and/or the components thereof in limited spaces requiring turns and bends in their length. They are comprised of sections which are joined and sealed to prevent leakage and connect to various accessories such as pumps, valves, switches, etc., of the associated system which are often relatively sensitive mechanisms. In order to permit access to these lines and the allied accessories for the repair, service and replacement thereof, closable openings are provided in the skin of the aircraft usually as near as possible to the parts requiring attention. Due to the complexity of aircraft, particularly the interior thereof, such access openings are not always ideally located; and even where they are, adjacent internal structure and components often complicate such operations.

When it is necessary to remove a section of pipe for its replacement or repair or the replacement or repair of associated accessories (seals and the like), the entire area is exposed to potential damage. This not only includes the parts within the area but also the structure, both internal and external as well. These pipe sections are often press fitted in end-to-end overlap to facilitate their separation; but because of the seal requirement therebetween, they usually become stuck after use due to the exposure of the seal to the fuel in the line. Thus, in an effort to pry the adjacent sections apart, the skin and its external surface can be and has been damaged.

The tool herein proposed is therefore directed to and affords the solution for the above problems primarily. In its broadest aspects this tool comprises means for its connection to one of a pair of joined pipes only and the concurrent engagement of associated stationary structure in opposition to such connection together with force-applying means for the relative linear movement of said connection and said engagement at a controlled rate whereby the connected pipe is slowly separated from the other in an axial direction.

The above general objects as well as other objects and advantages of the invention will become more apparent with the specific description that follows which is directed to a preferred embodiment of a tool constructed, designed and arranged in accordance with the teachings hereof as illustrated in the accompanying drawings wherein:

FIGURE 1 is an isometric view of the instant tool;

FIGURE 2 is a section taken along line 2—2 of FIGURE 1;

FIGURE 3 is a plan view of the tool as it would be applied to separate the sections of a fuel line within an aircraft to show the flush position thereof against the external surface of the aircraft skin and engagement by the tool of the edge of the skin defining an access opening therein as well as a connection of the tool to the closure that normally overlies such opening and to which one of the fuel line sections is attached, only a fragment of the aircraft being shown; and FIGURE 4 is a perspective view of the closure illustrated in FIGURE 3 to show a fuel pump assembly mounted on the inner surface thereof and to which a fuel line section is immovably connected, the associated end of the adjacent section being shown immediately after its separation therefrom.

Referring more particularly to the drawings, 10 designates a fragment of an aircraft component or fuel tank having a fuel pump 11 mounted therein and operative to force fuel normally carried by the tank to a remote engine of the aircraft through a fuel line or duct 12. The duct 12 is formed by multiple sections or lengths of pipe or tubing press fitted end to end in overlapped relation. Similarly, the duct 12 associated with the pump 11 is joined thereto through a flared end 13 adapted to receive in snug engagement a fuel outlet duct 14 from the pump 11. A conventional seal 15 mounted on the surface of the outlet duct 14 is adapted to coact with the adjacent surface or flare 13 of the duct 12 to prevent the leakage of fuel therefrom.

In order to permit access internally of the tank 10, an opening 16 is provided therein, such opening being normally closed and sealed by a door 17 removably secured in position by threaded fasteners following customary practice. To facilitate repair and servicing of the pump 11, it is immovably mounted on the inner surface of the door 17; and when installed, the outlet duct 14 is inserted in the flared end 13 of the duct 12. Such installation presents no real problem since the ducts 12 and 14 are substantially axially aligned and the opening 16 is sufficiently larger in diameter than the adjacent portion of the pump 11 to allow limited lateral movement.

When the pump 11 is installed, the tank 10 filled, and the pump operative for the flow of fuel through the ducts 12 and 14, however, the seal 15 expands and interengagement of the ducts 12 and 14 becomes rigid. This ensures a reliable installation but if and when disassembly is required (for example, to repair and/or service the interior of the tank 10, the pump 11 or replace the seal 15), separation of the ducts 12 and 14 is difficult. The force required to be applied to the duct 14 through the door 17 and/or the pump 11 must not only be sufficient to overcome the engagement of the duct ends across the seal 15 but also the limited linear movement of or spring in the duct 12 and the several other sections that make up the fuel line. In applying such force, chances are that the door 17, the wall or skin of the tank 10, or the ducts 12 and 14 will be bent or otherwise damaged to prevent the reassembly thereof. At the same time there is the possibility that the pump 11 itself, including its several fittings and operating parts, may be impaired.

The tool constructed in accordance with the teachings of the instant invention accomplishes the necessary separation of the ducts 12 and 14 without any accompanying damage to the tank 10, its structure or the several components of the fuel system. To this end, the tool consists of a relatively stationary puller element 18 and a relatively movable pusher element 19 slidably associated therewith. The puller element 18 is formed by a base wall 20 defined on two sides by laterally disposed walls 21 and at one end by a similar wall 22. At its other end the puller element 18 is formed or otherwise provided with a lateral projection 23 that extends therefrom in an opposite direction from the walls 21 and 22.

The surface of the base wall 20 enclosed by the walls 21 and 22 constitutes the upper surface 20' of the puller element 18 and is flat, i.e., perpendicular to the walls 21 and 22. The opposed or lower surface 20" of the base wall 20 conforms generally to the surface of the component or tank 10 adjacent the opening 16 so as to lie substantially flush therewith.

The pusher element 19 is formed by a plate 24 terminating at one end in a laterally disposed wall 25. The overall length of the plate 24 is less than that of the base wall 20 of the puller element 18, and its width is substantially equal to the space between the side walls 21 thereof. The lower surface 24', i.e., the surface remote from the end wall 25 of the plate 24, is flat whereby it lies flush against the upper surface 20' of the base wall 20 of the puller element 18 when disposed therein with its end wall 25 parallel to and proximate the end wall 22 thereof. Thus disposed the puller element 18 is maintained in the pusher element 19 by a retaining block or keeper 26 the opposite sides of which are secured as by welding to the adjacent surfaces of the side walls 21 and its lower face in close proximity to the associated surface of the plate 24. The pusher element 19 is thereby free for relative linear movement in the puller element 18 as limited by movement of its end wall 25 between the end wall 22 and the adjacent end of the keeper 26 of the puller element 18 and restricted from all other movement.

The length of the pusher element 19 is such that as the end wall 25 thereof moves from the wall 22 of the puller element 18 toward the keeper 26, the outer end of the plate 24 extends a predetermined distance beyond the corresponding end of the base wall 20. A pair of apertures 27 corresponding in shape and area and distance, one from the other, to adjacent fastener openings in the door 17 pierce this outer end of the plate 24. Each of these apertures 27 is threaded to receive a bolt 28 which may be one of the fasteners employed to normally secure the door 17 in place over the access opening 16.

In view of the foregoing construction, the tool herein proposed is adapted to be disposed adjacent the access opening 16 when the several fasteners have been released and the door 17 removed therefrom with its projection 23 engaging the edge of the opening 16. The surface 20" is at the same time disposed flush against the surface of the tank 10. The pusher element 19 is moved outwardly of the puller element 18 to locate the apertures 27 in alignment with the adjacent fastener openings in the door 17. A bolt 28 is then inserted into each of the aligned openings so that the door 17 is now, in effect, integral with the plate 24. The pusher element 19 is then forcibly extended outwardly of the puller element 18 to effect the axial movement of the duct 14 relative to the duct 12 causing their separation.

In order to apply this required force and at a uniform rate, a power actuator is provided as a component part of the assembly. This actuator comprises a screw 29 threadably mounted in a corresponding hole provided therefor in the end wall 22 of the puller element 18. At its outer end the screw 29 terminates in a head 30 adapted to receive a handle, crank or wrench (not shown) by which it is readily turned extending it into and withdrawing it from the space defined by the walls 21 and 22. At its inner end the screw 29 contacts the end wall 25 of the pusher element 19 causing the outward extension thereof from the puller element 18.

It is to be understood that the foregoing disclosure is directed to one preferred embodiment of the invention to facilitate a clear understanding thereof. Several detailed variations and modifications will be apparent to those skilled in the art without departing from the underlying inventive concept. It is therefore intended to cover all such variations and modifications in the appended claims which alone define the limitations of the invention.

What is claimed is:

1. A linear force-applying tool for the separation of parts joined in axial alignment and located adjacent fixed structure comprising:

a puller element formed by a base wall defined on three sides by angularly disposed walls extending in one direction and on the other side by a lateral projection extending in the other direction and constituting an engagement connectable to said fixed structure when disposed in a plane substantially parallel to said joined parts to secure said puller element to said fixed structure against relative movement;

a pusher elememnt formed by a plate disposed within said puller element in sliding relation therewith, a releasable connector adjacent one extremity of said plate connectable to one of said joined parts and an end wall at the other extremity of said plate extending laterally in one direction therefrom, the surface of said plate remote from said one end wall being shaped to conform with and lie flush against the surface of said base wall enclosed by said angularly disposed walls with said end wall disposed in the same general direction as said angularly disposed walls, the dimension of said plate between the angularly disposed walls on opposite sides of said base wall when lying flush as aforesaid being substantially equal to the distance between the opposite of said angularly disposed walls whereby movement of said end wall as aforesaid is guided thereby;

a power actuator operative between said elements to forcibly slide said pusher element when connected to one of the parts as aforesaid outwardly of said puller element when engaged to fixed structure as aforesaid; and retaining means operative between said puller element and said pusher element to restrict movement of the latter relative to the former by operation of the actuator as aforesaid.

2. The tool of claim 1 including a keeper connected between said opposite angularly disposed walls and disposed in close proximity to the surface of said plate and adjacent said base wall to prevent relative lateral movement between said pusher and said puller elements.

References Cited

UNITED STATES PATENTS 1,357,870  11/1920  Hume _____ 29—256 X

OTHELL M. SIMPSON, *Primary Examiner.*

WILLIAM FELDMAN, *Examiner.*

J. C. PETERS, *Assistant Examiner.*